(12) United States Patent
Kobayashi

(10) Patent No.: US 7,306,070 B2
(45) Date of Patent: Dec. 11, 2007

(54) VARIABLE GEAR RATIO HYDRAULIC POWER STEERING DEVICE

(75) Inventor: Yukihiro Kobayashi, Okazaki (JP)

(73) Assignee: JTEKT Corporation, Osaka (JP)

( * ) Notice: Subject to any disclaimer, the term of this patent is extended or adjusted under 35 U.S.C. 154(b) by 331 days.

(21) Appl. No.: 11/097,301

(22) Filed: Apr. 4, 2005

(65) Prior Publication Data

US 2005/0229592 A1   Oct. 20, 2005

(30) Foreign Application Priority Data

Apr. 20, 2004   (JP) ............................. 2004-123747

(51) Int. Cl.
*B62D 5/30* (2006.01)
(52) U.S. Cl. ...................... 180/406; 180/403; 180/421; 180/444
(58) Field of Classification Search ................ 180/402, 180/403, 404, 405, 406, 421, 422, 423, 444, 180/446
See application file for complete search history.

(56) References Cited

U.S. PATENT DOCUMENTS

| | | | |
|---|---|---|---|
| 4,691,796 A | | 9/1987 | Tanooka et al. |
| 4,992,944 A | * | 2/1991 | Noto et al. ................... 701/41 |
| 6,076,627 A | | 6/2000 | Bohner et al. |
| 6,164,150 A | | 12/2000 | Shindo et al. |
| 6,219,604 B1 | * | 4/2001 | Dilger et al. .................. 701/41 |
| 6,220,385 B1 | | 4/2001 | Bohner et al. |
| 6,705,420 B2 | * | 3/2004 | Ono et al. ................... 180/407 |
| 6,938,721 B2 | * | 9/2005 | Ono et al. ................... 180/402 |
| 2006/0060412 A1 | * | 3/2006 | Bolourchi et al. .......... 180/443 |

FOREIGN PATENT DOCUMENTS

| | | |
|---|---|---|
| EP | 1 359 083 A2 | 11/2003 |
| EP | 1 568 571 A2 | 8/2005 |
| JP | 2-56274 | 11/1990 |
| JP | 10-324263 | 12/1998 |
| JP | 2006082804 A * | 3/2006 |

* cited by examiner

*Primary Examiner*—Kevin Hurley
(74) *Attorney, Agent, or Firm*—Oblon, Spivak, McClelland, Maier & Neustadt, P.C.

(57) ABSTRACT

A variable gear ratio hydraulic power steering device 1 is provided with a variable ratio transmission mechanism 7 for varying the rotation transmission ratio between the rotational angle of a steering handle 31 and the rotational angle of a pinion shaft 33 and a flow volume control valve 40 for controlling the discharge flow volume of an oil pump 10 which circulates operating fluid. The variable ratio transmission mechanism 7 has a lock mechanism 75. A valve controlling controller 50 for controlling the flow volume control valve 40 switches main and secondary flow volume control maps for controlling the flow volume control valve 40, in dependence on the operational state of the lock mechanism 75. Thus, a failsafe function for the variable ratio transmission mechanism 7 is given to the variable gear ratio hydraulic power steering device 1.

10 Claims, 10 Drawing Sheets

VARIABLE GEAR RATIO HYDRAULIC POWER STEERING DEVICE

This application claims priority under 35 U.S.C. 119 with respect to Japanese Application No. 2004-123747 filed on Apr. 20, 2004.

BACKGROUND OF THE INVENTION

1. Field of the Invention

The present invention relates to a variable gear ratio hydraulic power steering device with a failsafe function for a variable ratio transmission mechanism.

2. Discussion of the Related Art

Heretofore, as hydraulic power steering devices, there has been known one for example which is provided with a variable ratio transmission mechanism for varying the rotation transmission ratio between a steering shaft coupled to a steering handle and a pinion shaft coupled to a pinion gear meshing with a rack gear and which is constructed to make variable the overall gear ratio (a value obtained by dividing the steering angle of a steering handle by the steered angle of steerable wheels) of a steering mechanical train thereof (e.g., refer to Patent Document 1). With the variable ratio transmission mechanism, it can be realized to set the overall gear ratio to be low (i.e., to a quick side) in a low speed range for reduction of the handle manipulation amount by the driver and to set the overall gear ratio to be high (i.e., to a slow side) in a high speed range for enhancement of the traveling stability.

Further, there has been known one which is provided with a flow volume control valve for controlling the flow volume of operating fluid supplied from an oil pump to a power cylinder and which is constructed to control the flow volume control valve electronically (e.g., refer to Patent Document 2). In the power steering device, a vehicle speed, a handle steering angle and so on are taken as control inputs, and the discharge flow volume of the oil pump is regulated by controlling the valve opening degree of the flow volume control valve based on these control inputs. Thus, steering assist force to be generated is properly controlled by regulating the discharge flow volume of the oil pump, so that the handle steering feeling felt by the driver and energy-saving effect are compatible with each other.

Further, there has been known a variable gear ratio hydraulic power steering device for example which is constituted by combining the aforementioned flow volume control valve for controlling the discharge flow volume of the oil pump with the aforementioned variable ratio transmission mechanism for varying the rotation transmission ratio. In the variable gear ratio hydraulic power steering device, the control by the variable ratio transmission mechanism is cooperated with the control of the discharge flow volume by the flow volume control valve, whereby further improvements are made in handle steering feeling as well as in energy-saving effect.

[Patent Document]: Japanese unexamined, published patent application No. 10-324263

[Patent Document]: Japanese examined, published patent application No. 2-56274

However, the variable gear ratio hydraulic power steering device in the prior art is accompanied by the following problems. That is, the flow volume of the operating fluid discharged by the aforementioned oil pump is set on the assumption that the aforementioned overall gear ratio is being controlled variably. Thus, when the rotational transmission ratio of the variable ratio transmission mechanism is fixed for some troubles, it tends to occur that the flow volume of the operating fluid discharged by the oil pump falls into an excessive or short state. Further, it tends to occur that the excessive or short flow volume discharged from the oil pump causes the steering assist force to be excessive or insufficient, whereby the handle steering feeling, the traveling stability or the like cannot be kept in a proper state.

SUMMARY OF THE INVENTION

Accordingly, it is a primary object of the present invention to provide a variable gear ratio hydraulic power steering device which is capable of performing a failsafe function for a variable ratio transmission mechanism.

Briefly, according to the present invention, there is provided a variable gear ratio hydraulic power steering device having a variable ratio transmission mechanism for varying the rotation transmission ratio $V2/V1$ between the rotational angle $V1$ of a first steering shaft coupled to a steering handle and the rotational angle $V2$ of a second steering shaft coupled to a pinion shaft, a transmission ratio controlling controller for controlling the variable ratio transmission mechanism, a flow volume control valve for controlling the discharge flow volume of an oil pump which circulates operating fluid, and a valve controlling controller for controlling the flow volume control valve. In the variable gear ratio hydraulic power steering device, the variable ratio transmission mechanism is provided with a lock mechanism for restricting relative rotation between the first steering shaft and the second steering shaft, and the valve controlling controller is provided with a memory function of storing main and secondary flow volume control maps each mapping various flow volume control values for controlling the flow volume control valve and a sensing function of detecting the operational state of the lock mechanism. The valve controlling controller is constructed to control the flow volume control valve by the use of the main flow volume control map when the lock mechanism permits the relative rotation between the first and second steering shafts and to control the flow volume control valve by the use of the secondary flow volume control map when the lock mechanism restricts the relative rotation between the first and second steering shafts.

The valve controlling controller in the variable gear ratio hydraulic power steering device according to the present invention is provided with the memory function of storing the main and secondary flow volume control maps each mapping various flow volume control values for controlling the flow volume control valve and the sensing function of detecting the operational state of the lock mechanism. Further, the valve controlling controller is constructed to control the flow volume control valve by the use of the main flow volume control map when the lock mechanism permits the relative rotation between the first and second steering shafts and to control the flow volume control valve by the use of the secondary flow volume control map when the lock mechanism restricts the relative rotation between the first and second steering shafts.

In the variable gear ratio hydraulic power steering device, the larger the rotation transmission ratio $V2/V1$ is made to be, the quicker the steering operation becomes. Therefore, for obtaining a sufficient steering force, it is necessary to control the flow volume control valve so that the discharge flow volume of the oil pump is increased. Conversely, the smaller the rotation transmission ratio $V2/V1$ is made to be, the slower the steering operation becomes. Therefore, for obtaining a proper steering force, it is necessary to control the flow volume control valve so that the discharge flow volume of the oil pump is suppressed.

In the variable gear ratio hydraulic power steering device according to the present invention, the main and secondary flow volume control maps for use in controlling the flow volume control valve are selectively used in dependence on the operational state of the lock mechanism. Thus, in the variable gear ratio hydraulic power steering device, even when the lock mechanism fixes the rotational transmission ratio of the variable ratio transmission mechanism, it can be realized to set the discharge flow volume of the oil pump to a proper flow volume by making a switching to the control depending on the secondary flow volume control map. Therefore, it hardly occurs that a too much discharge flow volume from the oil pump makes the steering assist force excessively large or that a lack in the discharge flow volume makes the steering assist force insufficient. In this way, the variable gear ratio hydraulic power steering device according to the present invention is provided with a failsafe function for the variable ratio transmission mechanism and can be improved in reliability in operation.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

Figure 2:
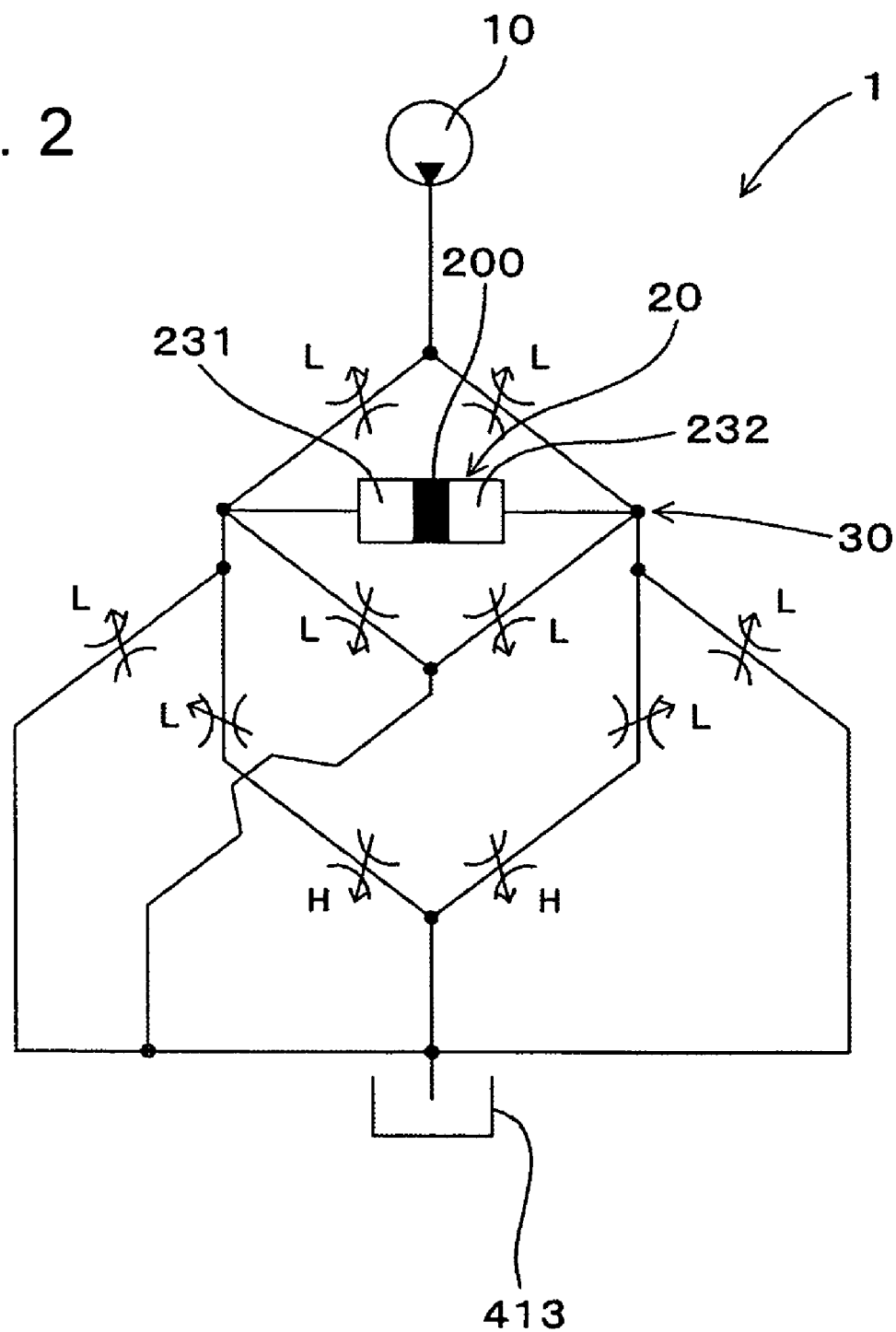
FIG. 2 is a hydraulic circuit diagram showing a hydraulic circuit of the variable gear ratio power steering device in the first embodiment.
Figure 11A:
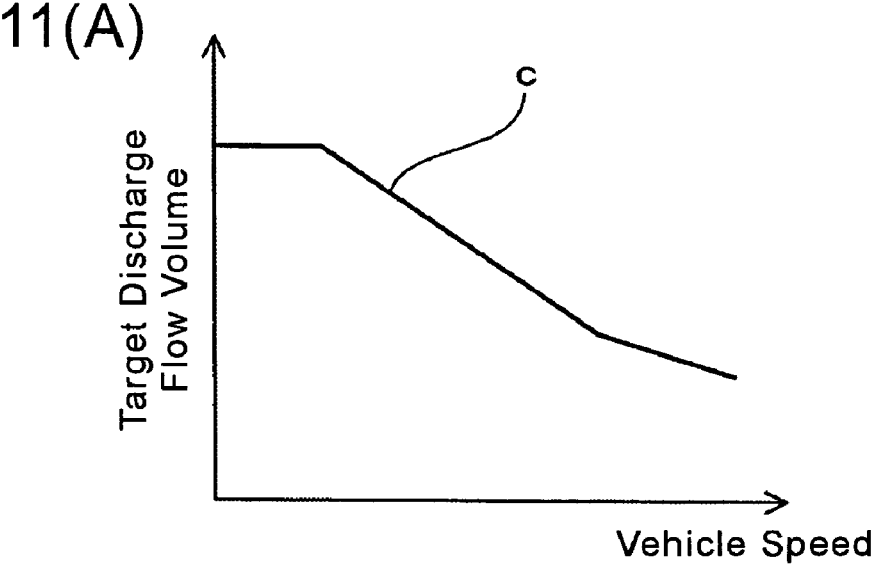
Figure 11B:
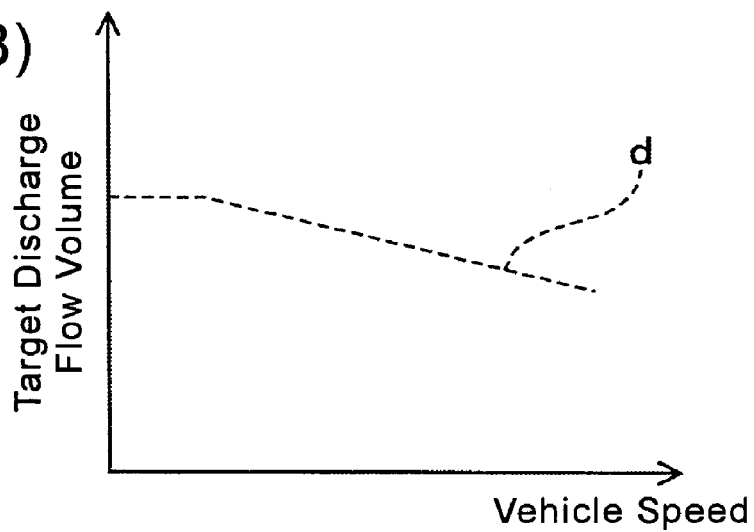
Figure 11C:
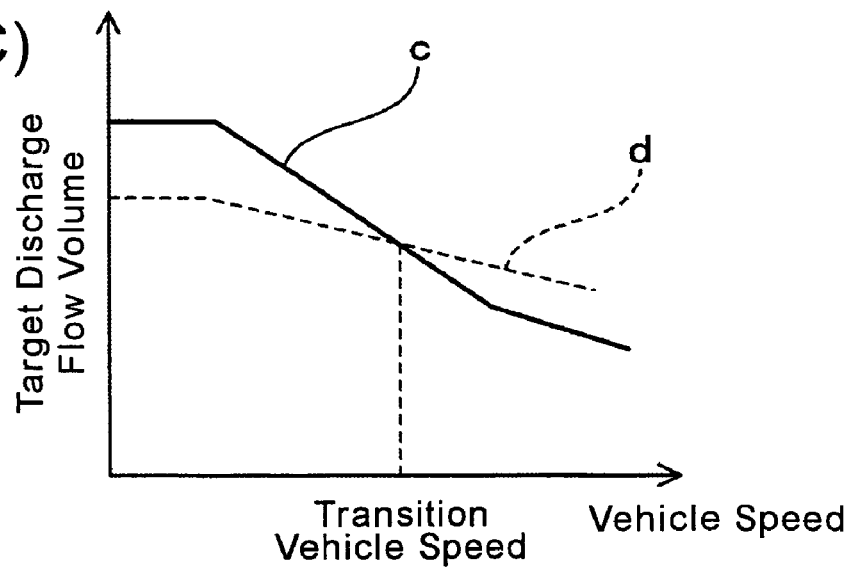
Figure 12:
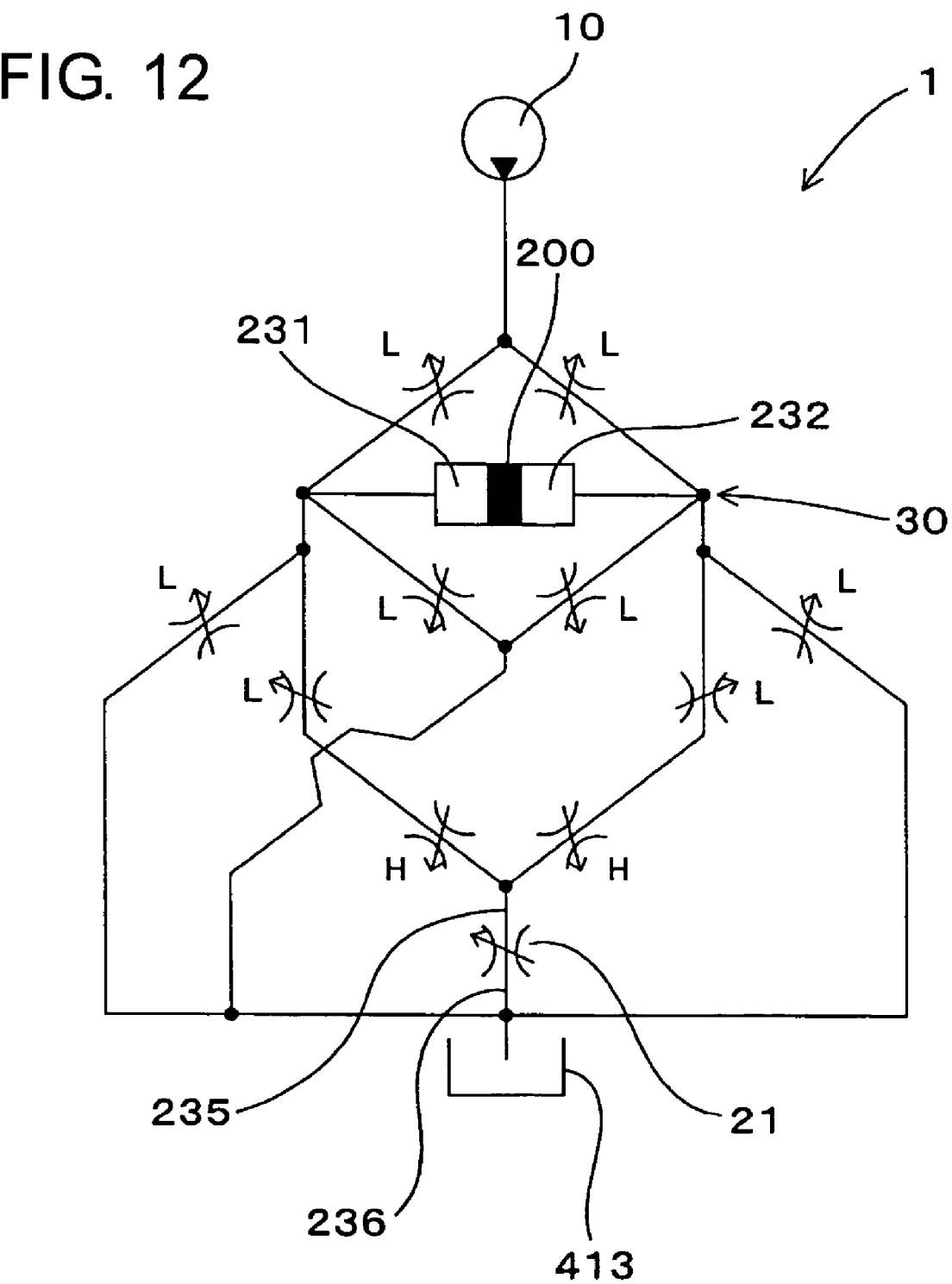

FIGS. 11(A), 11(B) and 11(C) are graphs each showing various target discharge flow volumes relative to various vehicle speeds in the first embodiment; and FIG. 12 is another hydraulic circuit diagram used in place of that shown in FIG. 2 in the first embodiment.

DETAILED DESCRIPTION OF THE PREFERRED EMBODIMENTS

First Embodiment

The present embodiment is a variable gear ratio hydraulic power steering device 1 which is provided with a variable ratio transmission mechanism 7 and which is capable of performing a failsafe function for the variable ratio transmission mechanism 7. The details of the present embodiment will be described with reference to FIGS. 1 to 11.

Figure 1:
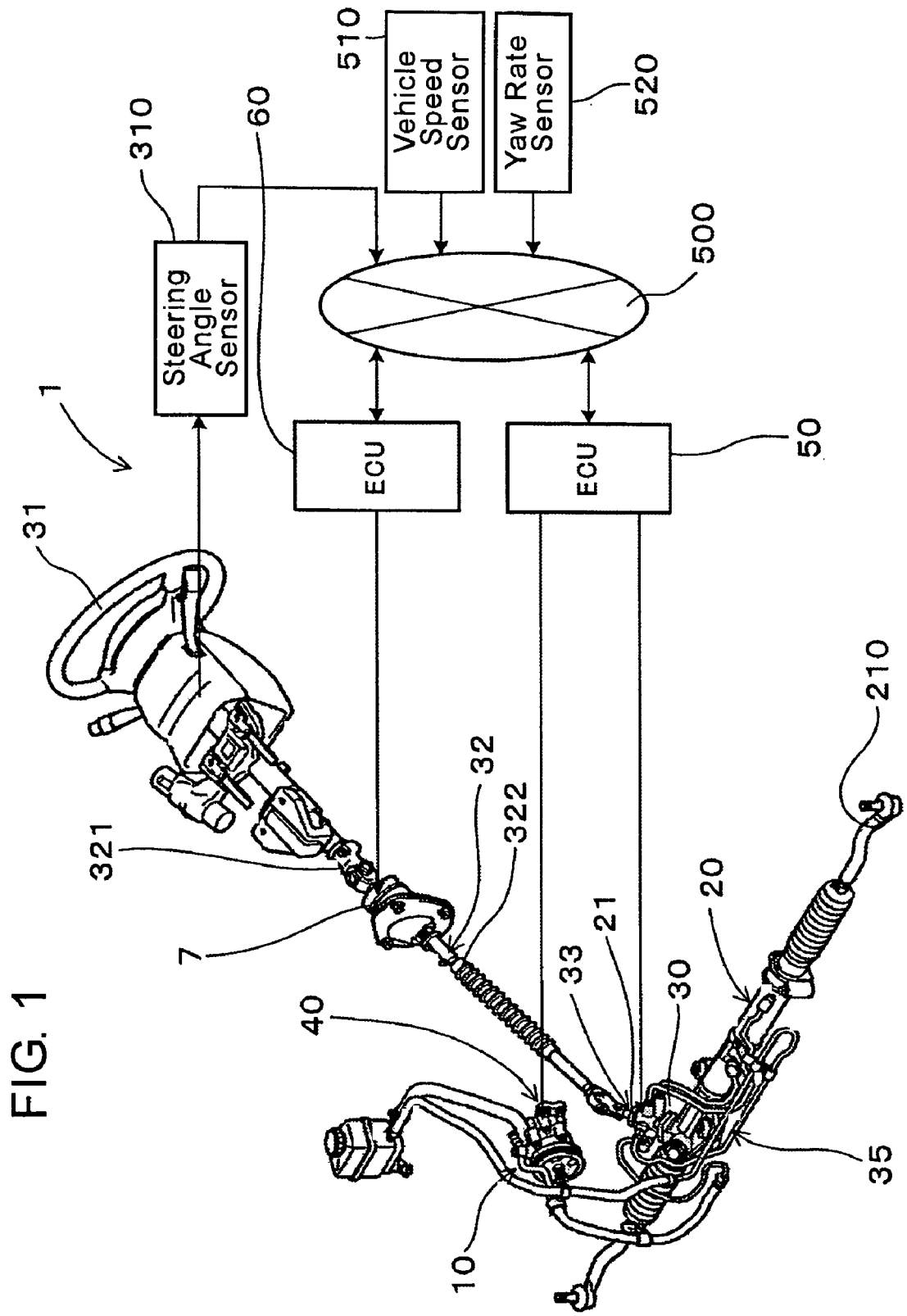
FIG. 1 is a perspective view showing a variable gear ratio power steering device in a first embodiment according to the present invention.

As shown in FIG. 1, the variable gear ratio hydraulic power steering device 1 in the present embodiment is provided with a first steering shaft 321 coupled to a steering handle 31, a second steering shaft 322 coupled to a pinion shaft 33, the variable ratio transmission mechanism 7 for altering or varying the rotation transmission ratio V2/V1 between the rotational angle V1 of the first steering shaft 321 and the rotational angle V2 of the second steering shaft 322, a transmission ratio controlling controller 60 for controlling the variable ratio transmission mechanism 7, a flow volume control valve 40 for controlling the discharge flow volume of an oil pump 10 which circulates operating fluid, and a valve controlling controller 50 for controlling the flow volume control valve 40.

Figure 4:
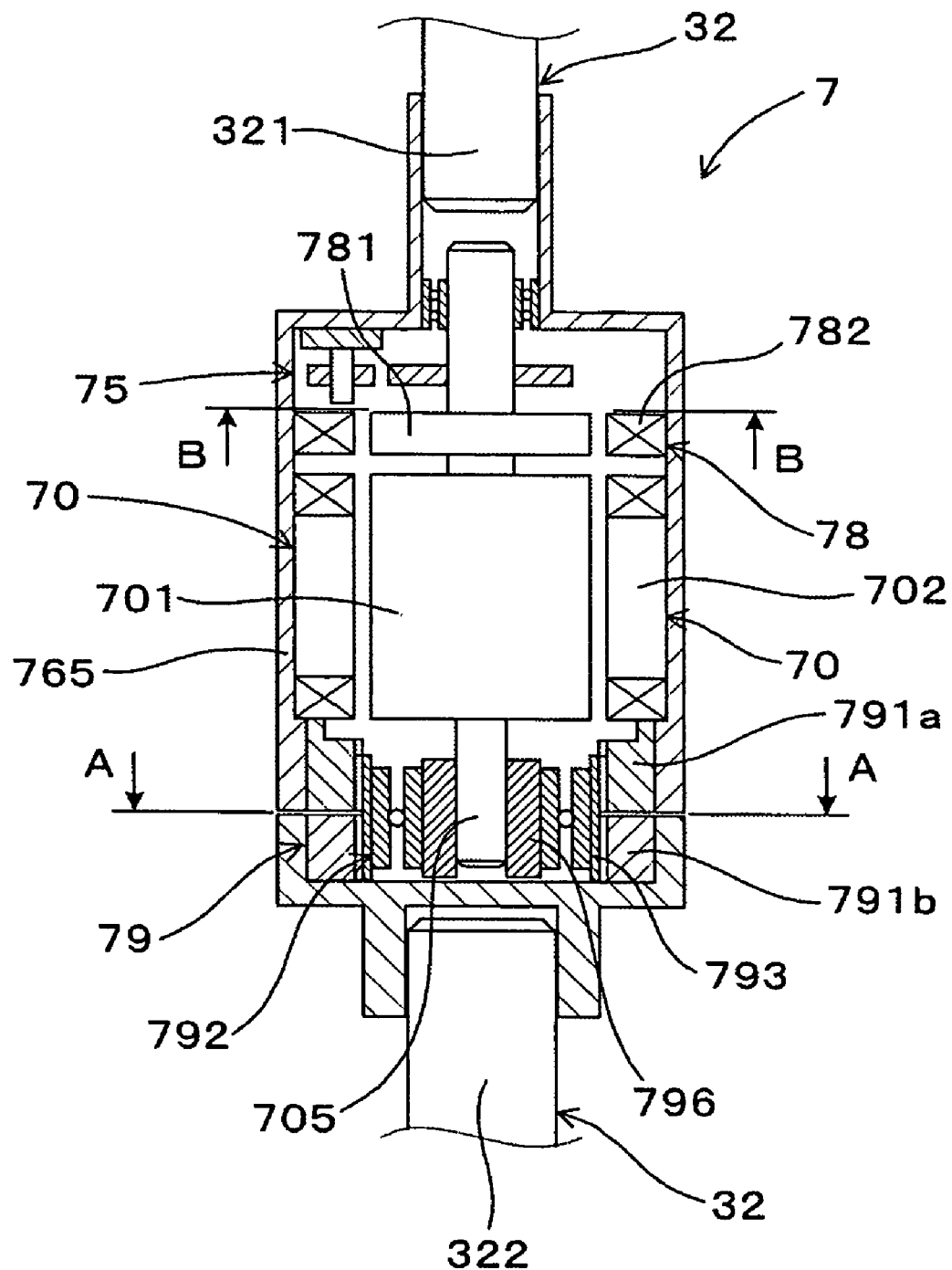
FIG. 4 is a sectional view showing the sectional structure of a variable ratio transmission mechanism in the first embodiment.

As shown in FIG. 4, the variable ratio transmission mechanism 7 is provided with a lock mechanism 75 for restricting the relative rotation between the first steering shaft 321 and the second steering shaft 322.

Figure 7:
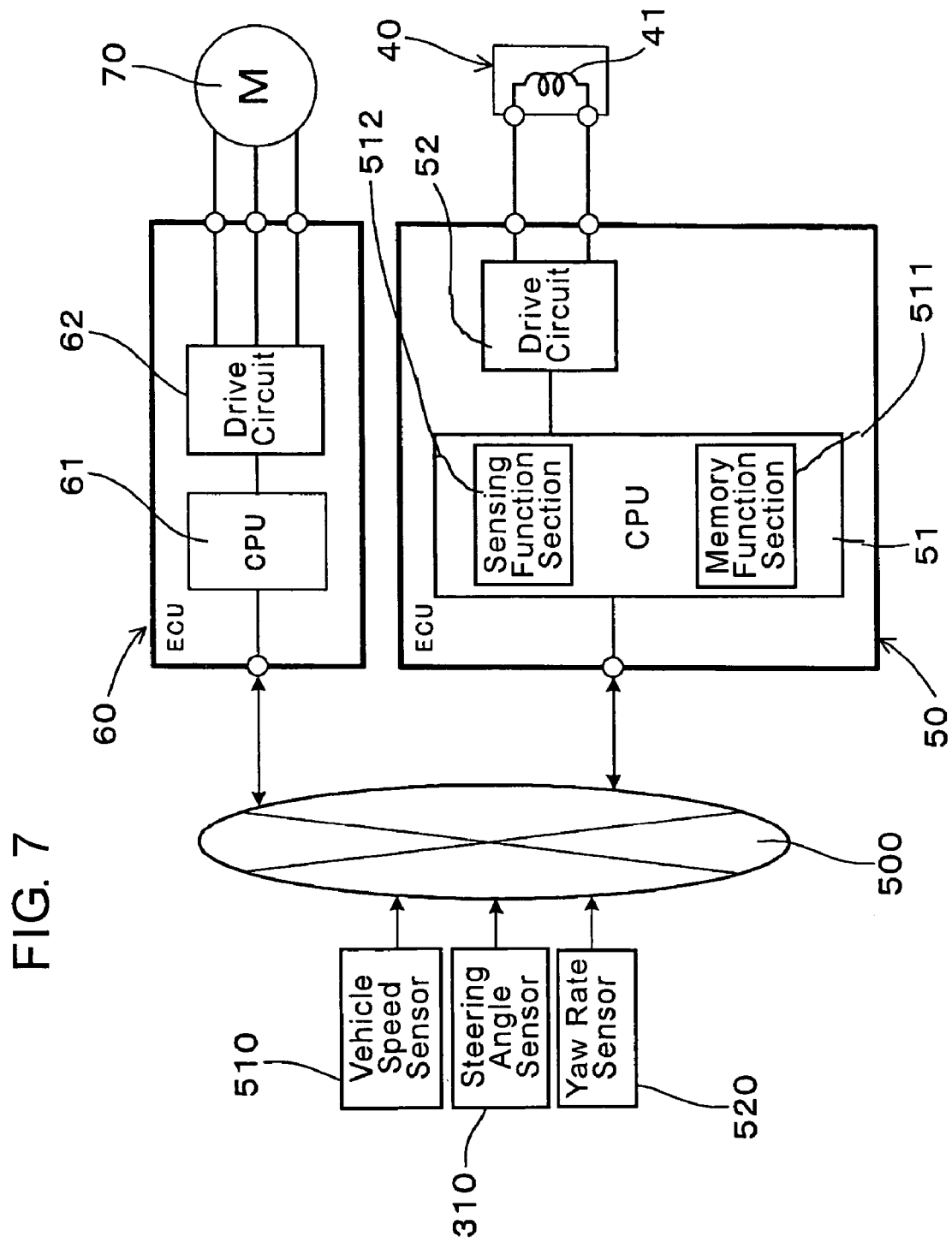
FIG. 7 is a system block diagram showing a control system of the variable gear ratio power steering device in the first embodiment.

As shown in FIG. 7, the valve controlling controller 50 is provided with a memory function section 511 for performing a memory function of storing flow volume control maps, each of which arranges or maps thereon flow volume control values for used in controlling the flow volume control value 40, and a sensing function section 512 for performing a sensing function of detecting the operational state of the lock mechanism 75. Further, the valve controlling controller 50 is constructed to control the flow volume control valve 40 by the use of a main flow volume control map when the lock mechanism 75 permits the foregoing relative rotation and to control the flow volume control valve 40 by the use of a secondary flow volume control map when the lock mechanism 75 restricts the foregoing relative rotation.

The embodiment will be described hereinafter in detail.

As shown in FIGS. 1 and 2, the power steering device 1 in the present embodiment is provided with a steering gear box 35 incorporating therein a rack-and-pinion type gear mechanism, in which a rack shaft (not shown) formed with a rack gear is in meshing with a pinion gear of the pinion shaft 33. The variable ratio transmission mechanism 7 for varying an overall gear ratio which is a value representing the ratio of the steering angle of the steering handle 31 to the steered angle of steerable wheels is arranged between the pinion shaft 33 and the steering handle 31.

The variable gear ratio power steering device 1 is provided as hydraulic circuit components with the oil pump 10 as a pressurized oil source for discharging operating fluid, a power cylinder 20 for applying steering assist force to the rack shaft, and a rotary-type servo valve 30 for switching the flow paths for the operating fluid between the oil pump 10 and the power cylinder 20.

The oil pump 10 in the present embodiment shown in FIGS. 1 and 2 is a vane type pump. A drive shaft (not shown) of the pump 10 is in driving connection with an output shaft of a vehicle engine (not shown) through a pulley-belt mechanism (not shown). The power cylinder 20 is constituted to slide a piston 200 in dependence on the pressure difference between a pair of pressure chambers 231 and 232 defined at opposite ends thereof. Further, the servo valve 30 is fit on the external surface of the pinion shaft 33 which transmits the rotation of the steering shaft 32 coupled to the steering handle 31.

That is, the variable gear ratio power steering device 1 in the present embodiment is of a hydraulic type that the servo valve 30 switches the flow paths for the operating fluid in dependence on the rotational torque transmitted to the pinion shaft 33, to control the charging/discharging of the operating fluid into and from the respective pressure chambers 231, 232. The variable gear ratio power steering device 1 in the present embodiment is constructed so that steering assist force generated by the power cylinder 20 is applied to the rack shaft to steer the steerable road wheels (not shown).

Brief description will be made regarding a hydraulic circuit which is constructed as shown in FIG. 2 in the variable gear ratio power steering device 1 in the present embodiment. Represented in the form of ten (10) throttles in this figure is the aforementioned servo valve 30 in the present embodiment, which is provided with eight (8) low speed throttles (indicated at "L" in the figure) and two (2) high speed throttles (indicated at "H" in the figure). In the hydraulic circuit, the operating fluid discharged from the oil pump 10 is distributed to the pressure chambers 231 and 232 of the power cylinder 20 by way of the low speed throttles L and is flown into a reservoir tank 413 by way of the high speed throttles H.

Figure 3:
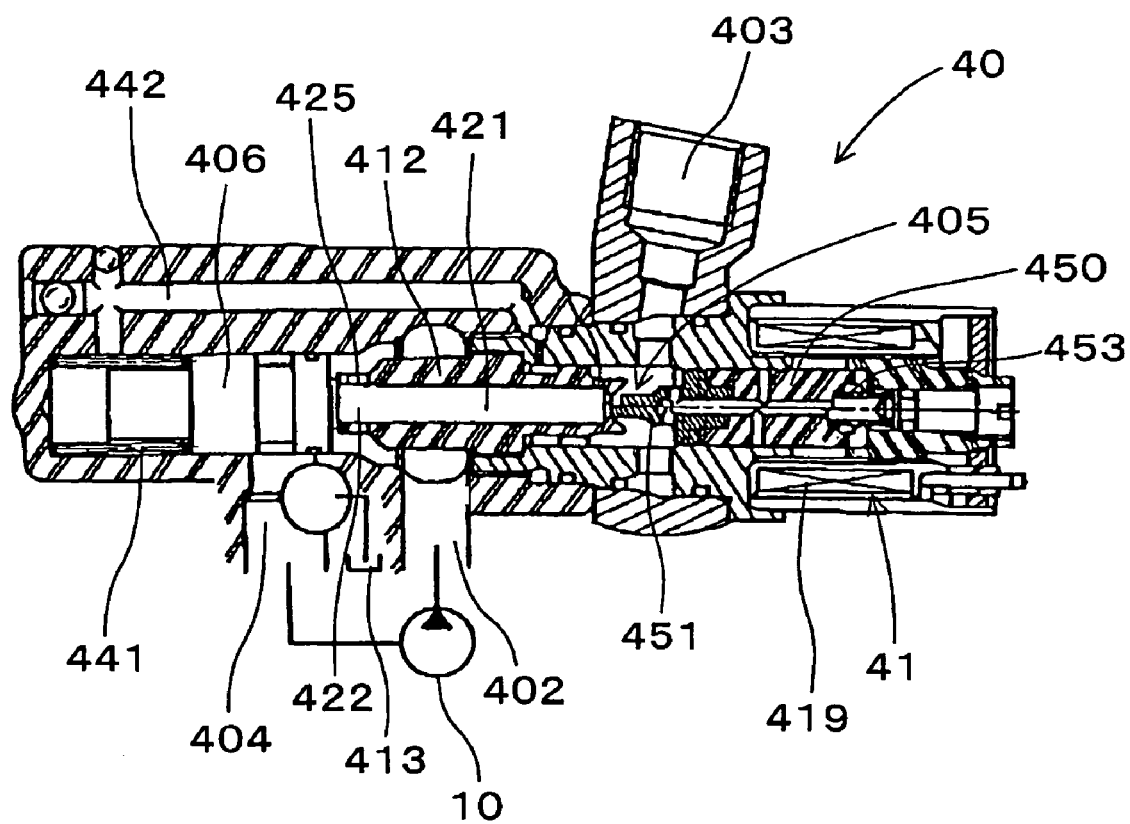
FIG. 3 is a sectional view showing the sectional structure of a flow volume control valve in the first embodiment.

As shown in FIG. 3, the oil pump 10 in the present embodiment incorporates therein a flow volume control valve 40 which is a mechanism for controlling the discharge flow volume of the oil pump 10 and which includes a solenoid valve 41. The flow volume control valve 40 is constructed to receive from an inlet port 402 the operating fluid discharged from the oil pump 10, to drain a part of the operating fluid to a return path 404 by the action of a spool valve member 406, and to supply the remaining part of the operating fluid from an outlet port 403 toward the servo valve 30.

The flow volume control valve 40 is composed of a throttle member 412 with an axial through hole 421, the spool valve member 406 urged toward the throttle member 412, and the solenoid valve 41 incorporating a plunger 450 having a valve element 451 formed bodily. The throttle member 412 has an open port 422 allowing the through hole 421 to open, at an end portion thereof on the side of the spool valve member 406 and a variable throttle 405 cooperating with the valve element 451, at the other end portion thereof on the side of the valve element 451.

A communication hole 425 for leading the operating fluid flown from the inlet port 402 into the through hole 421 is formed at a body portion adjacent to the open port 422 of the throttle member 412. Further, the spool valve member 406 is urged by means of a spring 441 and is in contact with the end portion of the throttle member 412 when at an ordinary home position. The spool valve member 406 blocks the communication of the open port 422 with the return path 404 when at the home position where it contacts with the throttle member 412, but allows the open port 422 to communicate with the return path 404 when displaced against the spring 441.

A pressure of the fluid past the variable throttle 405 acts on an end portion on the spring 441 side of the spool valve member 406 through a pressure path 442. Further, a pressure of the fluid toward the variable throttle 405 acts on the opposite end portion of the spool valve member 406. That is, the spool valve member 406 is constructed to be operated in dependence on the pressure difference across the variable throttle 405.

When an increase in the flow volume from the oil pump 10 causes the pressure difference across the variable throttle 405 to become equal to or greater than a predetermined value, the spool valve member 406 is displaced by the pressure difference between the both sides thereof to depart from the throttle member 412. This brings the inlet port 402 and the return path 404 into communication to increase the flow volume of that part returned toward the oil pump 10 of the operating fluid flown from the inlet port 402. By increasing the flow volume to be returned in this way, the flow volume control valve 40 in the present embodiment keeps the flow volume discharged from the outlet port 403 approximately constant regardless of the increase of the flow volume from the oil pump 10. Further, in the flow volume control valve 40, the aforementioned approximately constant flow volume discharged from the outlet port 403 is varied in dependence on the opening degree of the variable throttle 405.

The opening degree of the variable throttle 405 is controlled by the solenoid valve 41. This solenoid valve 41 is composed of a plunger 450, a solenoid 419 for attracting the plunger 450, and a spring 453 applying urging force toward the side of the valve element 451 to the plunger 450. With the solenoid 419 energized, the plunger 450 and the valve element 451 are attracted with the result that the valve element 451 departs from the throttle member 412 to increase the opening degree of the variable throttle 405. In the present embodiment, the electric current applied to the solenoid valve 41 is controlled in the form of duty pulses, whereby the discharge volume of the oil pump 10 is controlled in dependence of the duty ratio.

As shown in FIG. 4, the variable ratio transmission mechanism 7 is constructed so that the rotation transmission ratio is variable between the first steering shaft 321 coupled to the steering handle 31 (FIG. 1) and the second steering shaft 322 coupled to the pinion shaft 33 (FIG. 1). The variable ratio transmission mechanism 7 includes the steering shaft 32 composed of the first steering shaft 321 and the second steering shaft 322 and couples both steering shafts 321, 322 to each other through a wave motion reduction gear mechanism 79.

Figure 5:
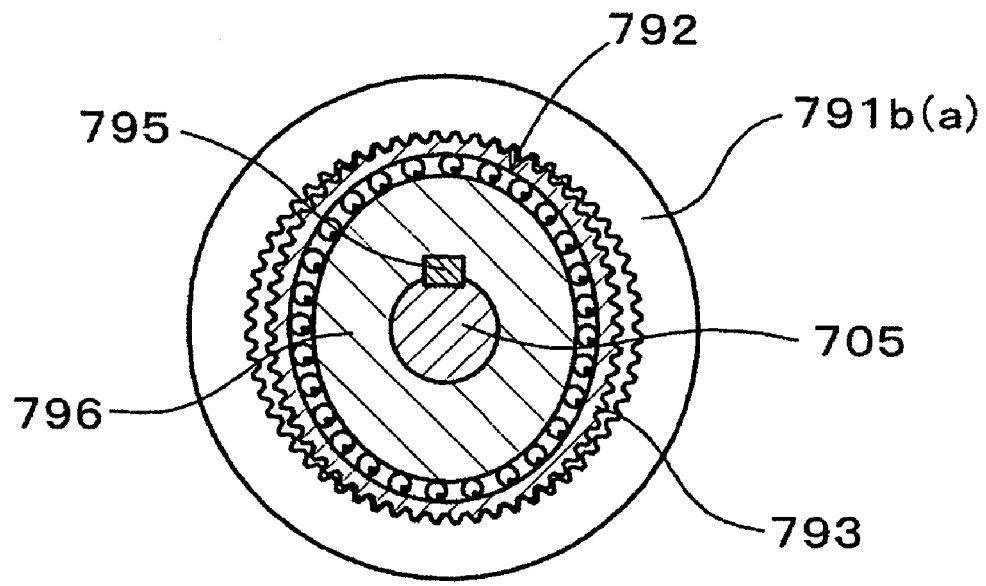
FIG. 5 is a front view showing a wave motion reduction gear mechanism in the first embodiment (a cross-section taken along the line A-A in FIG. 4)

As shown in FIG. 4, the variable ratio transmission mechanism 7 is constructed so that the rotation transmission ratio in transmitting the rotational motion from the first steering shaft 321 to the second steering shaft 322 is variable by inputting the rotational motion of a drive motor 70 to the wave motion reduction gear mechanism 79. As shown in FIG. 5, the wave motion reduction gear mechanism 79 is composed of a pair of circular spline members 791a and 791b, a flex spline member 793 in meshing with internal surface sides of the circular spine members 791a and 791b, and a wave generator 792 fitted in an internal surface side of the flex spline member 793.

In the variable ratio transmission mechanism 7 in the present embodiment, as shown in FIGS. 4 and 5, the first steering shaft 321 is arranged to be rotatable bodily with the circular spline member 791a through a housing 765. The second steering shaft 322 is arranged to be rotatable bodily with the circular spline member 791b. Further, an output shaft 705 of the drive motor 70 which is fixed to the interior of the housing 765 rotatable bodily with the first steering shaft 321 is press-fitted into a cam 796 constituting the wave generator 792, together with a press-fitted key 795.

The variable ratio transmission mechanism 7 is constructed to transmit the rotation of the wave generator 792 to the circular spline member 791b at a reduced speed when the wave generator 792 is rotated by the operation of the drive motor 70. In this embodiment, the transmission ratio controlling controller 60 is utilized to control the drive motor 70, so that the rotation transmission ratio of the variable ratio transmission mechanism 7 can be adjusted.

As shown also in FIG. 4, the variable ratio transmission mechanism 7 incorporates a resolver 78 therein in a juxtaposed relation to the drive motor 70 for measuring the rotational angle of the rotor 701, that is, the motor rotational angle. The resolver 78 includes a resolver rotor 781 rotatable bodily with the rotor 701 and a coil 782 secured to the internal surface of the housing 765 to be positioned around the resolver rotor 781. The resolver 78 is constructed to output induced current which is generated to alter or vary in dependence on the rotation of the resolver rotor 781, to the transmission ratio controlling controller 60.

Figure 6:
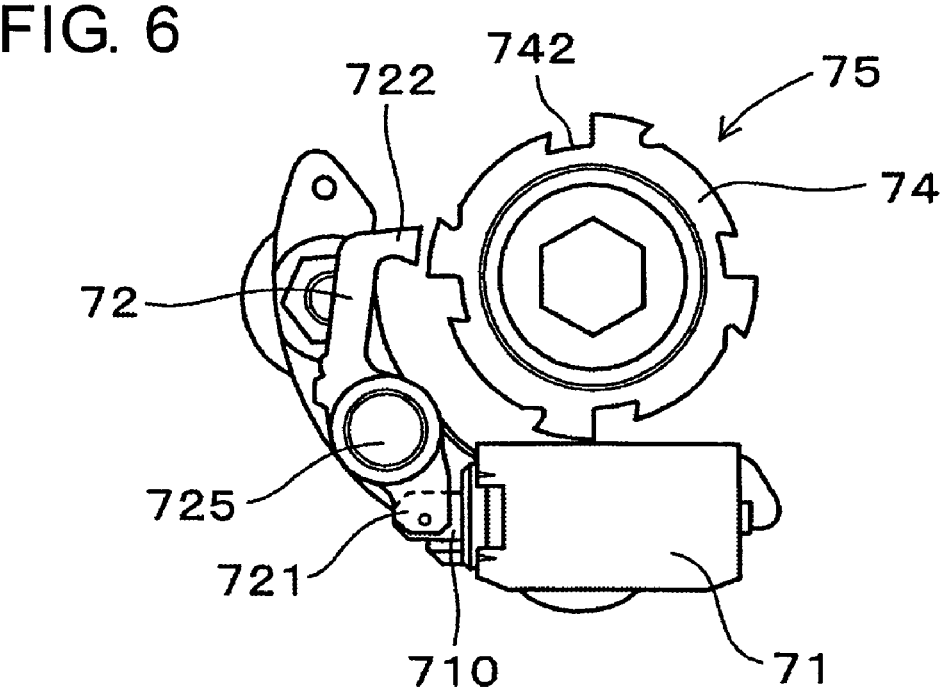
FIG. 6 is a front view showing a lock mechanism built in the variable ratio transmission mechanism in the first embodiment (a cross-section taken along the line B-B in FIG. 4)

As shown also in FIG. 4, the variable ratio transmission mechanism 7 in the present embodiment is further provided with a lock mechanism 75 for locking or unlocking the relative rotation between the rotor 701 and the stator 702. In the lock mechanism 75, as shown in FIG. 6, a lock lever 72 pivotable about a pin shaft 725 and a lock solenoid 71 for attracting a plunger 710 are arranged at the stator 702 side of the drive motor 70. Further, a lock plate 74 is arranged at the rotor 701 side to rotate bodily with the rotor 701. An actuation portion 721 engaged with an extreme end of the plunger 710 and an engaging portion 722 engageable with the circumferential portion of the lock plate 722 are formed on the lock lever 72 at opposite ends of the same with the pin shaft 725 located therebetween. The lock plate 74 is formed at the circumferential portion with hollow portions 742 each permitting the engaging portion 722 to engage therewith.

In the lock mechanism 75, urging force by means of a spring (not shown) acts to rotate the lock lever 72 in a clockwise direction. Thus, with the lock solenoid 71 being in a de-energized state, the engaging portion 722 of the lock lever 72 is brought into engagement with any one of the hollow portions 742 of the lock plate 74 to lock the rotor 701 and the stator 702 against relative rotation to each other. With the drive motor 70 (FIG. 4) locked against rotation, the relative rotation between the first steering shaft 321 and the second steering shaft 322 is restricted to set the rotation transmission ratio to be value 1.

When the lock solenoid 71 is energized to attract the plunger 710, on the contrary, the lock lever 72 is rotated in a counterclockwise direction about the pin shaft 725 to make the engaging portion 722 depart from the circumferential portion of the lock plate 74. Therefore, in the lock mechanism 75 in the present embodiment, relative rotation is permitted between the rotor 701 (FIG. 4) and the stator 702 (FIG. 4) with the lock solenoid 71 being energized. Thus, the relative rotation is permitted between the first steering shaft 321 and the second steering shaft 322.

Next, the aforementioned valve controlling controller 50 and the aforementioned transmission ratio controlling controller 60 will be described hereinafter.

As shown in FIGS. 1 and 7, the valve controlling controller 50 and the transmission ratio controlling controller 60 are connected to a CAN (Control Area Network) network 500 of the vehicle together with a vehicle speed sensor 510, a steering angle sensor 310 and a yaw rate sensor 520.

The transmission ratio controlling controller 60 is constituted to take thereinto a vehicle speed, a handle steering angle and a measured yaw rate and to calculate a handle angular velocity by time-differentiating the handle steering angle. Further, the transmission ratio controlling controller 60 is constructed to adjust the rotation transmission ratio between the first and second steering shafts 321, 322 by controlling the rotation of the drive motor 70 based on the vehicle speed, the handle steering angle, the handle angular velocity and the measured yaw rate.

As shown in the same figure, the transmission ratio controlling controller 60 is provided with a one-chip microcomputer 61, incorporating a ROM, a RAM and a CAN interface (all not shown), and a drive circuit 62 for driving the drive motor 70. The transmission ratio controlling controller 60 controls the rotation of the drive motor 70 thereby to realize a desired rotation transmission ratio between the first and second steering shafts 321, 322. By realizing the desired rotation transmission ratio, the transmission ratio controlling controller 60 arbitrarily sets an overall gear ratio which represents the dimension of the steering angle per steered angle of the steered wheels.

Description will be made hereafter regarding the control which the transmission ratio controlling controller 60 executes for the variable ratio transmission mechanism 7. The transmission ratio controlling controller 60 varies the aforementioned overall gear ratio based on the vehicle speed, the handle steering angle, the handle angular velocity and so on.

Figure 8:
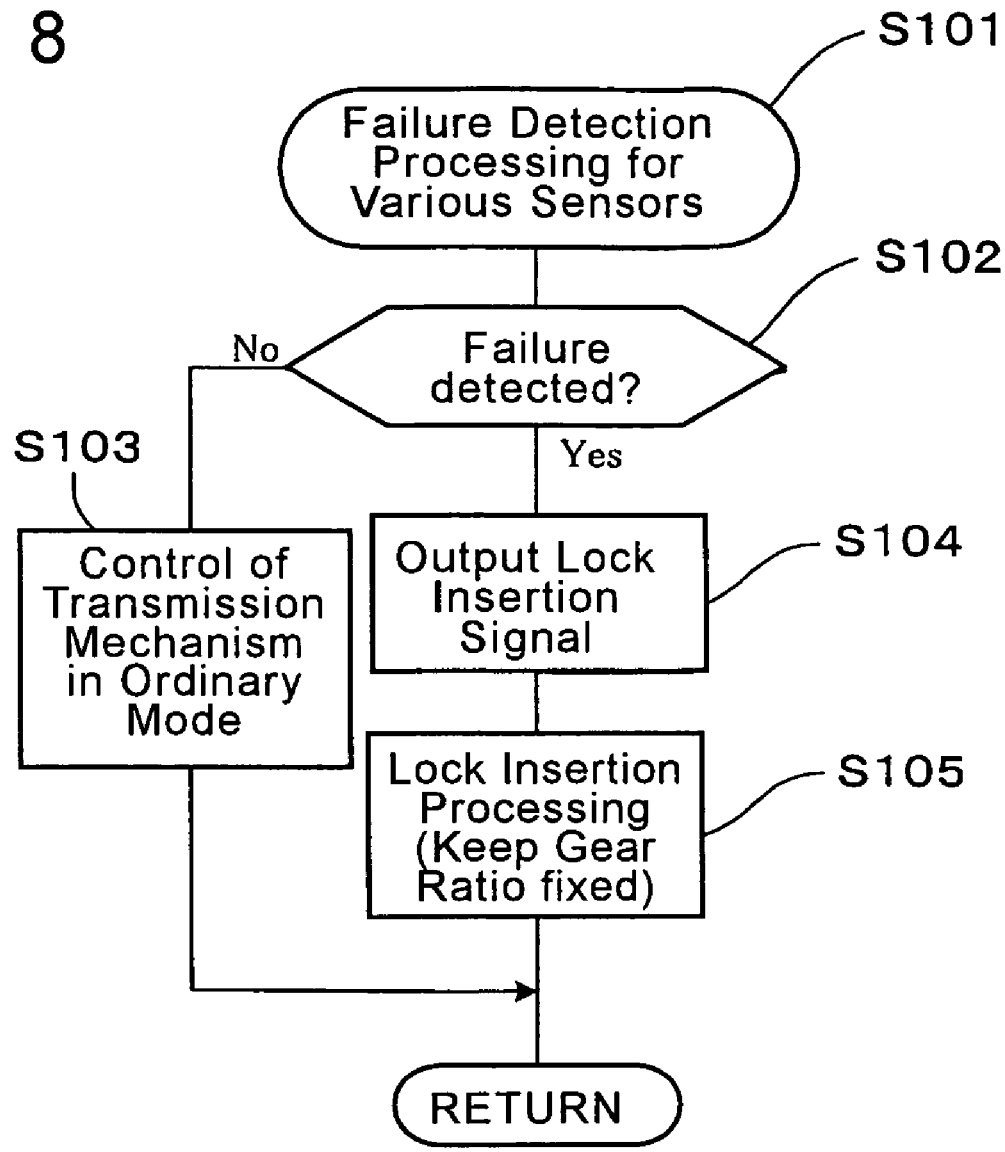
FIG. 8 is a control flow chart showing procedural steps executed by a transmission ratio controlling controller in the first embodiment.

The transmission ratio controlling controller 60 operates in accordance with a flow chart shown in FIG. 8. That is, at step S101, the controller 60 executes a processing for detecting the occurrences of abnormality (failure) on various sensors used for control. The controller 60 at step S102 judges whether or not a failure has been detected on any of the sensors.

Where all the sensors are judged to be normal (i.e., properly operating), the program proceeds to step S103 to control the variable ratio transmission mechanism 7 in an ordinary control mode. That is, at this step, the variable ratio transmission mechanism 7 is controlled so that the overall gear ratio is set properly in dependence on the traveling state, as indicated by the solid line (a) in FIG. 9. For better understanding, this figure exemplifies the relation between the vehicle speed as one of control input variables and the overall gear ratio. The figure defines the vehicle speed on the horizontal axis and the overall gear ratio on the vertical axis. In this embodiment, the variable ratio transmission mechanism 7 is controlled to make the steering operation quick in a low speed range by setting the overall gear ratio to be small (rotation transmission ratio (V2/V1)>1) and to make the steering operation slow in a high speed range by setting the overall gear ratio to be large (rotation transmission ratio (V2/V1)<1).

On the other hand, where a failure is detected on any of the sensors at step S102, the transmission ratio controlling controller 60 proceeds to step S104 and transmits a lock insertion signal to the lock mechanism 75. Thus, at step S105, the lock mechanism 75 restricts the relative rotation between the first and second steering shafts 321, 322 and fixes the rotation transmission ratio (V2/V1) of the variable ratio transmission mechanism 7 to value 1. As a result, as indicated by the broken line (b) in FIG. 9, the overall gear ratio is set to a constant value (hereafter referred to as "reference overall gear ratio") irrespective of variation in the vehicle speed.

Figure 9:
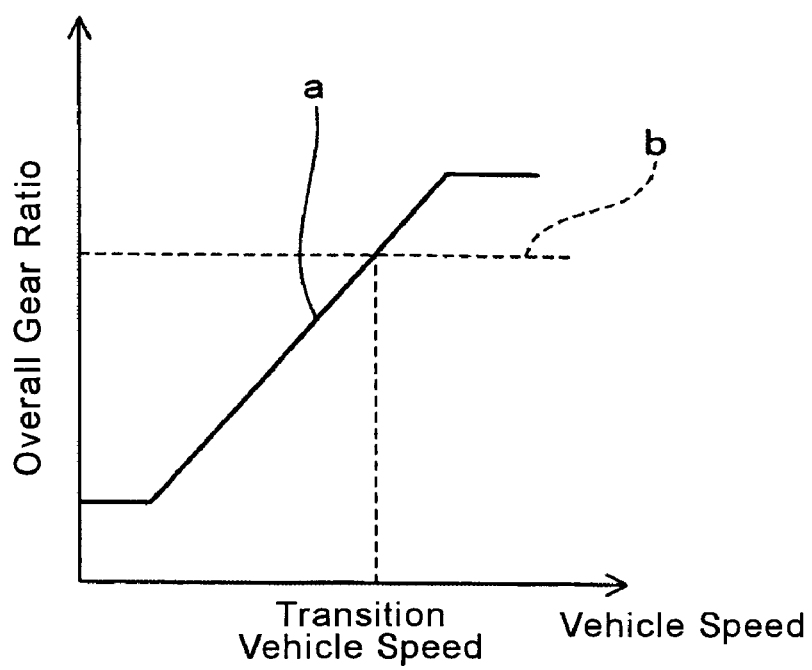
FIG. 9 is a graph showing the relation between vehicle speeds and overall gear ratios in the variable gear ratio power steering device in the first embodiment.
Figure 10:
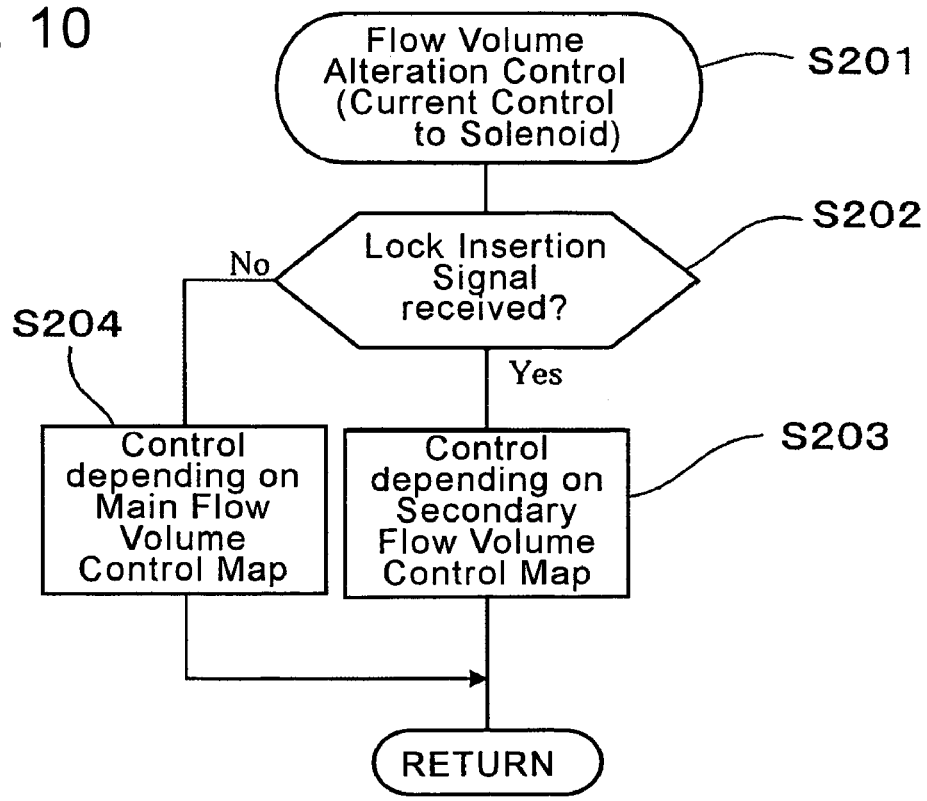
FIG. 10 is a control flow chart showing procedural steps executed by the valve controlling controller in the first embodiment.

As shown in FIG. 9, in the variable gear ratio power steering device 1 in the present embodiment, the overall gear ratio is set to be smaller than the reference overall gear ratio (to quick side) when the vehicle speed is in the low speed range. Further, the lower the vehicle speed becomes, the smaller the overall gear ratio is made to be. Where the vehicle speed is in the high speed range, on the contrary, the overall gear ratio is set to be larger than the reference overall gear ratio (to slow side), and the higher the vehicle speed becomes, the larger the overall gear ratio is made to be. In this embodiment, a vehicle speed at which the overall gear ratio coincides with the reference overall gear ratio is defined as a transition vehicle speed which transitions from the low speed range to the high speed range, or vice versa. That is, the variable ratio transmission mechanism 7 in the present embodiment is controlled to make value 1 of the rotation transmission ratio (V2/V1) at the transition vehicle speed and to shift the rotation transmission ratio (V2/V1) from "over 1" (the lower speed range) to "under 1" (high speed range) with a boundary of the transition speed.

The valve controlling controller 50 will be described hereinafter. As shown in FIG. 7, the valve controlling controller 50 is constructed to take thereinto a vehicle speed and a handle steering angle transmitted from the CAN network 500 and to control the flow volume control valve 40 based on these inputs. Further, the valve controlling controller 50 is constructed to be able to receive by way of the CAN network 500 the control signal which the transmission ratio controlling controller 60 transmits toward the lock mechanism 75 (FIG. 6). In the present embodiment, a duty control under which cyclic pulse-like voltage is applied to the solenoid 419 is carried out to continuously control the valve opening degree of the flow volume control valve 40.

As shown in FIG. 7, the valve controlling controller 50 is provided with a one-chip microcomputer 51, incorporating a ROM, a RAM and a CAN interface (all not shown), and a drive circuit 52 for driving the flow volume control valve 40 under duty control. As described earlier, the valve controlling controller 50 is provided with the memory function section 511 for storing the flow volume control maps, each of which maps thereon various flow volume control values for used in controlling the flow volume control value 40, and the sensing function section 512 for detecting the operational state of the lock mechanism 75.

The microcomputer 51 is constructed to make a judgment, based on a control signal (lock insertion signal referred to later) for the lock mechanism 75, of whether or not the lock mechanism 75 restricts the relative rotation between the first and second steering shafts 321, 322, that is, to realize the aforementioned sensing function. To obtain the aforementioned control signal, it may be possible to utilize and directly watch the electric current applied to the solenoid 71 of the lock mechanism 75. Alternatively, a failure signal detected by the transmission ratio controlling controller 60, a failure signal regarding the lock mechanism 75 or the variable ratio transmission mechanism 7 or the like may be utilized as a reference signal for detecting the operational state of the lock mechanism 75.

Further, the memory function section 511 constituted by the ROM stores two kinds of flow volume control maps as those used in controlling the flow volume control valve 40. One of the two maps is a main flow volume control map shown in FIG. 11(A) for controlling the flow volume control valve 40 when the lock mechanism 75 permits the steering shafts 321 and 322 to rotate relatively. The other map is a secondary flow volume control map shown in FIG. 11(B) for controlling the flow volume control valve 40 when the lock mechanism 75 restricts the steering shafts 321 and 322 from relative rotation.

In this embodiment, the flow volume control valve 40 is controlled by having, as control input variables thereto, respective values such as, for example, vehicle speed value, handle steering angle and the like. Therefore, the main flow volume control map in the present embodiment is constructed as a multi-dimensional map taking vehicle speed value and handle steering angle as input variables or parameters thereto. Instead of using such a multi-dimensional map, there may be provided plural main flow volume control maps for respective control input variables, so that a final flow volume control value is obtained by adding flow volume control values chosen from the respective main flow volume control maps. Moreover, in substitution for each flow volume control map, there may be utilized an arithmetic expression for calculating the flow volume control value in dependence on variables such as vehicle speed value, handle steering angle and the like.

Next, description will be made as to the control executed by the valve controlling controller 0.50. The valve controlling controller 50 controls the flow volume control valve 40 in accordance with a flow chart shown in FIG. 10 to regulate the discharge flow volume of the oil pump 10.

In the variable gear ratio hydraulic power steering device 1, the following relation is provided between the overall gear ratio and a target discharge flow volume. That is, the smaller the overall gear ratio becomes, the quicker the steering operation is set to be, and the displacement of the piston 200 of the power cylinder 20 shown in FIG. 2 is increased. Therefore, for a sufficient steering assist force, it becomes necessary to increase the discharge flow volume of the oil pump 10. Conversely, the displacement of the piston 200 of the power cylinder 20 is diminished when the overall gear ratio becomes large. Therefore, for suppression of a risk of generating an excessively large steering assist force, it is necessary to suppress the discharge flow volume of the oil pump 10.

As represented at step S201, in controlling the discharge flow volume of the oil pump 10, the valve controlling controller 50 at step S202 judges whether or not it has received the lock insertion signal (step S104 in FIG. 8) from the transmission ratio controlling controller 60. When having not received the lock insertion signal, the valve controlling controller 50 moves to step S204 to control the flow volume control valve 40 by the use of the main flow volume control map shown in FIG. 11(A). At this step, the valve opening degree of the flow volume control valve 40 is controlled to obtain a target discharge flow volume from the oil pump by reference to FIG. 11(A). In the main flow volume control map, as shown in the same figure, the target discharge flow volume in the low speed range is set to be large in correspondence to the overall gear ratio which is controlled to be small in the low speed range as indicated by the solid line (a) in FIG. 9. Then, the target discharge flow volume is decreased as the overall gear ratio becomes larger with the increase of the vehicle speed.

When having received the lock insertion signal, on the contrary, the valve controlling controller 50 moves to step S203 to control the flow volume control valve 40 by the use of the secondary flow volume control map shown in FIG. 11(B). As shown in FIG. 11(C), the large-to-small relation between the target discharge volume (solid line (c)) defined by the main flow volume control map and the target discharge volume (broken line (d)) defined by the secondary flow volume control map is inverted at a turning point of the aforementioned transition vehicle speed.

More specifically, within the vehicle speed range lower than the transition vehicle speed, the reference overall gear ratio (broken line (b) in FIG. 9) is larger than the overall gear ratio (solid line (a) in FIG. 9) controlled by the variable ratio transmission mechanism 7. In correspondence to this setting, the target discharge volume defined by the secondary flow volume control map is set to be small compared with the target discharge flow volume defined by the main flow volume control map. Thus, the steering assist force can be prevented from being increased excessively. Further, within the vehicle speed range higher than the transition vehicle speed, the reference over gear ratio (broken line (b) in FIG. 9) is smaller than the overall gear ratio (solid line (a) in FIG. 9) controlled by the variable ratio transmission mechanism 7. In correspondence to this setting, the target discharge flow volume defined by the secondary flow volume control map is set to be large compared with the target discharge volume defined by the main flow volume control map. Thus, it can be avoided that an excessively large handle manipulation force is needed due to a lack of the steering assist force.

As described above, in the variable gear ratio hydraulic power steering device 1 in the present embodiment, the flow volume control maps for controlling the flow volume control valve 40 which regulates the discharge flow volume of the oil pump 10 are switched in dependence on whether or not the relative rotation between the steering shafts 321 and 322 is restricted by the lock mechanism 75. Thus, where the overall gear ratio is fixed to the reference overall gear ratio (broken line (b) in FIG. 9) with the variable ratio transmission mechanism 7 being placed in the direct connection state, the discharge flow volume of the oil pump 10 is regulated to keep the steering assist force in a proper value. That is, the variable gear ratio hydraulic power steering device 1 in the present embodiment excels in reliability in the failsafe function for the variable ratio transmission mechanism 7.

In a modified form or second embodiment, as shown in FIG. 12, the variable gear ratio hydraulic power steering device 1 may be provided in the hydraulic circuit with a secondary flow volume control valve 21 for regulating the throttle opening degree on a flow path which leads from the respective pressure chambers 231 and 232 of the power cylinder 200 to the reservoir tank 413. The secondary flow volume control valve 21 is constructed to control the opening degree between a communication path 235 communicating with the respective pressure chambers 231 and 232 and another communication path 236 communicating with the reservoir tank 413. Thus, the part drained to the reservoir tank 413 of the operating fluid which is supplied from the oil pump 10 toward the pressure chamber 231 (232) is regulated by the secondary flow volume control valve 21, whereby the ratio of the operating fluid to that part which is supplied to the power cylinder 20 to generate the steering assist force is controlled thereby to regulate the pressure in the pressure chamber 231 (232). In controlling the secondary flow volume control valve 21, the flow volume control maps may be switched, in the same way as applied to the flow volume control valve 40, in dependence on whether or not the variable ratio transmission mechanism 7 is controlling the overall gear ratio.

Various features and many of the attendant advantages in the foregoing embodiments will be summarized as follows:

In the variable gear ratio power steering device 1 in the foregoing embodiment typically shown in FIGS. 1, 6, 7, 10, 11(A) and 11(B), the main and secondary flow volume control maps (FIGS. 11(A) and 11(B)) are selectively used in dependence on the operational state of the lock mechanism 75. Thus, in the variable gear ratio hydraulic power steering device 1, even when the lock mechanism 75 fixes the rotational transmission ratio of the variable ratio transmission mechanism 7, it can be realized to set the discharge flow volume of the oil pump 10 to a proper flow volume by making a switching to the control depending on the secondary flow volume control map (FIG. 11(B). Therefore, it hardly occurs that a too much discharge flow volume from the oil pump 10 makes the steering assist force excessively large or that a lack of the discharge flow volume makes the steering assist force insufficient. In this way, the variable gear ratio hydraulic power steering device 1 in the first embodiment is provided with a failsafe function for the variable ratio transmission mechanism 7 and can be improved in reliability in operation.

Also in the variable gear ratio power steering device 1 in the foregoing embodiment typically shown in FIGS. 1, 4, 6 and 7, the valve controlling controller 50 is provided with a sensing function 512 of taking thereinto a reference signal related to the operational state of the lock mechanism 7 for restricting the relative rotation between the first and second steering shafts 321, 322 and is constructed to detect the operational state regarding whether the lock mechanism 75 restricts or permits the relative rotation between the first and second steering shafts 321, 322, based on the reference signal. With this construction, the operational state of the lock mechanism 75 regarding whether or not the relative rotation is restricted can be reliably detected based on the reference signal related to the operational state of the lock mechanism 75.

In the foregoing embodiment, the reference signal related to the operational state of the lock mechanism 75 means a signal which varies in dependence on the operational state of the lock mechanism 75. As the reference signal, any of various signals such as for example a failure signal detected by the transmission ratio controlling controller 60, another failure signal regarding the variable ratio transmission mechanism 7 or the like may be utilized in addition to the control signal for controlling the lock mechanism 75.

Also in the variable gear ratio power steering device 1 in the foregoing embodiment typically shown in FIGS. 1, 4, 6, 7 and 8, the control signal for controlling the lock mechanism 75 is utilized as the reference signal. In this case, the operational state of the lock mechanism 75 can be detected further reliably by utilizing the control signal for controlling the lock mechanism 75 as the reference signal. An electric current applied to the lock mechanism 75 may also be utilized as the control signal.

Further, in the variable gear ratio power steering device 1 in the foregoing embodiment typically shown in FIGS. 1, 7, 11(A) and 11(B), where various flow volume control values of the secondary flow volume control map (FIG. 11(B)) are set to suppress the discharge flow volume of the oil pump 10 in the control range in which the transmission ratio control target value is set to be over "1" (i.e., in which the overall gear ratio becomes small to make the steering operation quick), the rotational transmission ratio V2/V1 is fixed to value 1 so that the discharge flow volume can be prevented from being increased excessively. Thus, a risk can be avoided that the steering assist force becomes excessively large due to an excessive increase in the discharge flow volume. On the other hand, where various flow volume control values of the secondary flow volume control map (FIG. 11(B)) are set to increase the discharge flow volume of the oil pump 10 in the control range in which the transmission ratio control target value is set to be under "1" (i.e., in which the overall gear ratio becomes large to make the steering operation slow), the rotational transmission ratio V2/V1 is fixed to value 1 so that a lack in the discharge flow volume is obviated. Thus, another risk can also be obviated that a lack takes place in the steering assist force due to the lack of the discharge flow volume.

Additionally, in the variable gear ratio power steering device 1 in the foregoing embodiment typically shown in FIGS. 1 and 7, the transmission ratio controlling controller 60 and the flow volume controlling controller 50 can perform the cooperative operation therebetween by being integrated with each other.

Obviously, numerous further modifications and variations of the present invention are possible in light of the above teachings. It is therefore to be understood that within the scope of the appended claims, the present invention may be practiced otherwise than as specifically described herein.

What is claimed is:

1. A variable gear ratio hydraulic power steering device having a variable ratio transmission mechanism for varying the rotation transmission ratio V2/V1 between the rotational angle V1 of a first steering shaft coupled to a steering handle and the rotational angle V2 of a second steering shaft coupled to a pinion shaft, a transmission ratio controlling controller for controlling the variable ratio transmission mechanism, a flow volume control valve for controlling the discharge flow volume of an oil pump which circulates operating fluid which provides an assist force to the steering device, and a valve controlling controller for controlling the flow volume control valve, wherein:

the variable ratio transmission mechanism is provided with a lock mechanism for restricting relative rotation between the first steering shaft and the second steering shaft;

the valve controlling controller is provided with a memory for storing main and secondary flow volume control maps each mapping various flow volume control values for controlling the flow volume control valve, and a detector adapted to detect the operational state of the lock mechanism; and the valve controlling controller is constructed to control the flow volume control valve by the use of the main flow volume control map when the lock mechanism permits the relative rotation between the first and second steering shafts and to control the flow volume control valve by the use of the secondary flow volume control map when the lock mechanism restricts the relative rotation between the first and second steering shafts.

2. The variable gear ratio hydraulic power steering device as set forth in claim 1, wherein the detector is adapted to receive a reference signal related to the operational state of the lock mechanism for restricting the relative rotation between the first and second steering shafts and to detect the operational state regarding whether the lock mechanism restricts or permits the relative rotation between the first and second steering shafts, based on the reference signal.

3. The variable gear ratio hydraulic power steering device as set forth in claim 2, wherein the reference signal is a control signal for controlling the lock mechanism.

4. The variable gear ratio hydraulic power steering device as set forth in claim 1, wherein:

the transmission ratio controlling controller is constructed to vary a transmission ratio control target value for the rotation transmission ratio V2/V1 of the variable ratio transmission mechanism within a predetermined range including value 1 in dependence on a traveling state; and in a control range in which transmission ratio control target values smaller than value 1 are set by the transmission ratio controlling controller,various flow volume control values which are mapped in the secondary flow volume control map are set to more increase the discharge flow volume of the oil pump than various flow volume control values mapped in the main flow volume control map do; and in another control range in which transmission ratio control target values larger than value 1 are set by the transmission ratio controlling controller, various flow volume control values which are mapped in the secondary flow volume control map are set to more suppress the discharge flow volume of the oil pump than various flow volume control values mapped in the main flow volume control map do.

5. The variable gear ratio hydraulic power steering device as set forth in claim 2, wherein:

the transmission ratio controlling controller is constructed to vary a transmission ratio control target value for the rotation transmission ratio V2/V1 of the variable ratio transmission mechanism within a predetermined range including value 1 in dependence on a traveling state; and in a control range in which transmission ratio control target values smaller than value 1 are set by the transmission ratio controlling controller, various flow volume control values which are mapped in the secondary flow volume control map are set to more increase the discharge flow volume of the oil pump than various flow volume control values mapped in the main flow volume control map do; and in another control range in which transmission ratio control target values larger than value 1 are set by the transmission ratio controlling controller, various flow volume control values which are mapped in the secondary flow volume control map are set to more suppress the discharge flow volume of the oil pump than various flow volume control values mapped in the main flow volume control map do.

6. The variable gear ratio hydraulic power steering device as set forth in claim 3, wherein:

the transmission ratio controlling controller is constructed to vary a transmission ratio control target value for the rotation transmission ratio V2/V1 of the variable ratio transmission mechanism within a predetermined range including value 1 in dependence on a traveling state; and in a control range in which transmission ratio control target values smaller than value 1 are set by the transmission ratio controlling controller, various flow volume control values which are mapped in the secondary flow volume control map are set to more increase the discharge flow volume of the oil pump than various flow volume control values mapped in the main flow volume control map do; and in another control range in which transmission ratio control target values larger than value 1 are set by the transmission ratio controlling controller, various flow volume control values which are mapped in the secondary flow volume control map are set to more suppress the discharge flow volume of the oil pump than various flow volume control values mapped in the main flow volume control map do.

7. The variable gear ratio hydraulic power steering device as set forth in claim 1, wherein the transmission ratio controlling controller is integrated with the flow volume controlling controller.

8. The variable gear ratio hydraulic power steering device as set forth in claim 2, wherein the transmission ratio controlling controller is integrated with the flow volume controlling controller.

9. The variable gear ratio hydraulic power steering device as set forth in claim 3, wherein the transmission ratio controlling controller is integrated with the flow volume controlling controller.

10. The variable gear ratio hydraulic power steering device as set forth in claim 4, wherein the transmission ratio controlling controller is integrated with the flow volume controlling controller.

* * * * *